(12) United States Patent
Van de Ven

(10) Patent No.: US 7,444,521 B2
(45) Date of Patent: Oct. 28, 2008

(54) SYSTEM AND METHOD FOR DETECTING COMPUTER VIRUS

(75) Inventor: Adriaan D. M. Van de Ven, Boekel (NL)

(73) Assignee: Red Hat, Inc., Raleigh, NC (US)

(*) Notice: Subject to any disclaimer, the term of this patent is extended or adjusted under 35 U.S.C. 154(b) by 262 days.

(21) Appl. No.: 10/892,464

(22) Filed: Jul. 16, 2004

(65) Prior Publication Data

US 2006/0015747 A1     Jan. 19, 2006

(51) Int. Cl.
*G06F 11/30* (2006.01)
*G06F 12/14* (2006.01)
*H04L 9/32* (2006.01)

(52) U.S. Cl. ..................................... 713/188
(58) Field of Classification Search ................ 713/188, 713/88, 189; 726/27
See application file for complete search history.

(56) References Cited

U.S. PATENT DOCUMENTS 5,771,355 A * 6/1998 Kuzma ..................... 709/232
2002/0004908 A1 * 1/2002 Galea ......................... 713/200
2002/0007453 A1 * 1/2002 Nemovicher ................ 713/155
2002/0019827 A1 * 2/2002 Shiman et al. .............. 707/200
2002/0069358 A1 * 6/2002 Silvester ..................... 713/176
2002/0186257 A1   12/2002 Cadiz et al.
2005/0216418 A1 * 9/2005 Davis et al. ................... 705/59

OTHER PUBLICATIONS

International Search Report, PCT/US05/24650.

* cited by examiner

*Primary Examiner*—Kambiz Zand
*Assistant Examiner*—Jason K Gee
(74) *Attorney, Agent, or Firm*—Wilmer Cutler Pickering Hale and Dorr, LLP

(57) ABSTRACT

A method is disclosed for detecting computer viruses. The method allows receipt of an electronic mail message that includes at least one encrypted attachment. The electronic mail message is examined in order to identify potential encryption codes. The encryption codes are used in order to attempt and decrypt the attachments. The attachments are expanded into one or more files. The files are then checked for the presence of computer viruses.

23 Claims, 5 Drawing Sheets

SYSTEM AND METHOD FOR DETECTING COMPUTER VIRUS

BACKGROUND OF THE INVENTION

1. Technical Field

The present invention relates to the detection of computer viruses and, more particularly, to the detection of computer viruses stored in container formats.

2. Description of the Related Art

Computers are commonly used to perform various tasks and/or engage in certain pastimes. Many of these tasks and pastimes involve the use of the Internet and/or transmission and receipt of electronic mail messages. There are various complications associated with the use of computers and, in particular, the Internet. Malicious computer programs can be created to covertly infiltrate a user's computer to damage or perform actions beyond a user's control. These programs are commonly known as viruses, worms, Trojan horses, etc. (collectively "computer virus" hereinafter).

A computer virus is a program that can severely damage a user's computer by, for example, erasing all the data from a mass storage device such as a magnetic or optical drive. A computer virus can also take limited, or full, control of a computer and perform functions that are not approved by, or unknown to, the user. For example, a computer virus can send electronic mail messages (e.g., email) to the addresses stored in the user's email program. Computer viruses can be transferred in various ways, but are commonly transferred through electronic mail messages and/or executable program files. Under certain conditions, the executable program files can be attached to electronic mail messages. Additional examples of various modes of transferring computer viruses include program files, data files, and web pages that have been infected.

To prevent a virus from harming a user's computer, various steps may be taken to detect and, where possible, remove the computer virus. This task has proven to be increasingly difficult as computer viruses become more sophisticated and difficult to detect. In certain situations, it is possible to detect, but not remove the virus.

Various techniques have been created to detect computer viruses in electronic mail messages. Such techniques may involve, for example, scanning (i.e., examining) the contents of an electronic mail message using a virus detection program to identify potential computer viruses. Conventional virus detection programs have used a signature based detection method to identify computer viruses contained in electronic mail messages.

FIG. 6A is block diagram conceptually illustrating the configuration of an electronic mail message 500. The electronic mail message includes an envelope (or header) 510 that stores, for example, address information such as origination and destination. The envelope 510 may also contain optional information such as a subject line, priority, etc. The electronic mail message 500 could also include a message portion 512 that contains a letter, note, memo, or other type of information being transferred from a sender to a recipient. Certain electronic mail messages 500 can further include an attachment section 514 that contains one or more files 516 (i.e., attachments). The files 516 can be in the form of executable programs, data, pictures, etc. On certain occasions, however, a computer virus can attach itself to an electronic mail message 500.

FIG. 6B illustrates an exemplary attachment file 516 that has been infected with a computer virus 520. The computer virus 520 is an executable program that can perform certain malicious acts to the user's computer. The attachment file 516 is viewed as a textual representation 518 of the binary data that is executed by the computer. In order to detect the computer virus, a virus scanner would attempt to identify certain phrases (or signatures) within the textual representation. For example, the signature of the computer virus shown in FIG. 6B is SFQFAFADFWEFWE. Accordingly, the textual representation 518 of the binary data includes the virus signature 520. Upon scanning the attachment file 516, the virus checker would identify the virus signature 520 and alert the user that a computer virus has been detected.

Recently, computer viruses have become more advanced and, consequently, more difficult to detect. For example, certain computer viruses exist in the form of a container, or archive, format (e.g., .CAB, ZIP, etc.). Container and archive files often include their payload in the form of compressed data. An electronic mail message would contain a file attachment in the container format. When a user opens the electronic mail message to read its content, the computer transparently opens the container file without the user's knowledge. The virus is then free to infect and/or damage the user's computer.

Computer viruses stored in container files are often difficult to identify because the data compression routine can sometimes mask the virus signature. In order to detect such a computer virus, a virus detection program must examine the contents of the archive to determine whether the expanded (i.e., uncompressed) textual representation contains the virus signature. This can pose certain problems for identifying a computer virus before it has an opportunity to infect a user's computer.

More recently, container files are being created with encryption keys that prevent access to the constituent files stored therein. In such situations, the encryption key is also necessary to decrypt (or unlock) the container file. The electronic mail message can sometimes include a password in the message section that can be used by the user to unlock the container file. Once the container file is unlocked and opened, the computer virus infects the user's computer before being detected.

Based on the foregoing, it would be beneficial to provide a virus detection program that is capable of addressing at least some of the problems associated with detecting computer viruses. It would also be beneficial to provide an ability to detect viruses that are stored in encrypted container files.

SUMMARY OF THE INVENTION

In accordance with one or more embodiments, the present invention provides an ability to identify passwords in electronic email messages and unlock container files so that computer viruses can be detected.

In accordance with some embodiments of the invention, a computer system receives an electronic mail message that includes at least one encrypted attachment. The electronic mail message is examined to identify potential encryption codes. The system determines if the potential encryption codes will decrypt the attachment(s). If so, the codes are used to expand the attachment(s) into one or more files, which are scanned for computer viruses. This can be used to detect computer viruses that would normally evade detection from being hidden within encrypted container files.

It is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These, and various features of novelty which characterize the invention, are pointed out with particularity in the appended claims forming a part of this disclosure. For a better understanding of the invention, its operating advantages and the specific benefits attained by its uses, reference should be had to the accompanying drawings and preferred embodiments of the invention illustrating the best mode contemplated for practicing the invention.

DETAILED DESCRIPTION OF THE INVENTION

Reference now will be made in detail to preferred embodiments of the invention. Such embodiments are provided by way of explanation of the invention, which is not intended to be limited thereto. In fact, those of ordinary skill in the art will appreciate, upon reading the present specification and viewing the present drawings, that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Figure 1:
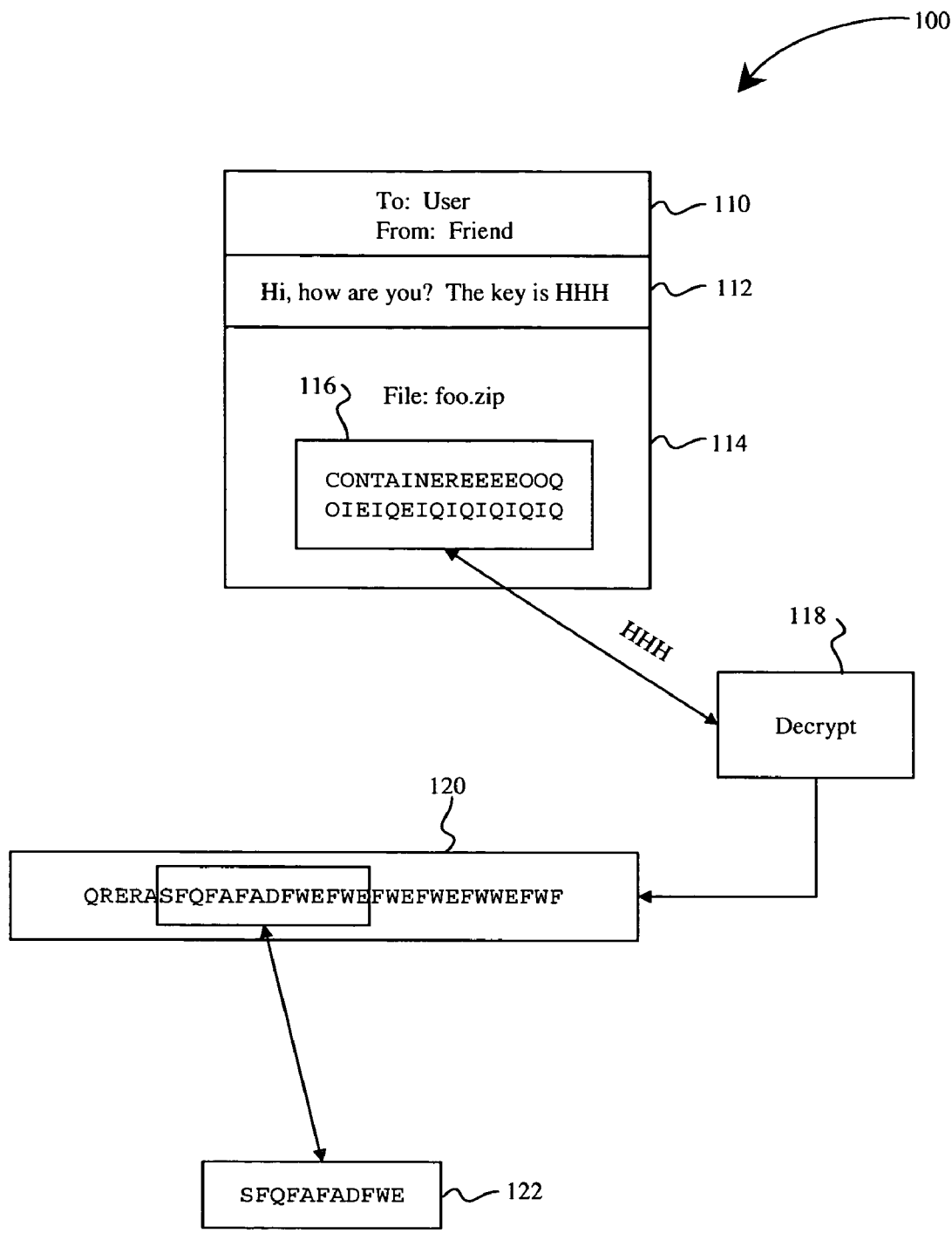
FIG. 1 is a block diagram illustrating the format and components of an electronic mail message.

Turning now to FIG. 1, a block diagram is shown for conceptually illustrating the format of an electronic mail message 100. The electronic mail message 100 includes an envelope portion 110, a message portion 112, and an attachment portion 114. The envelope portion 110 will typically contain information such as the sender's name and the recipient's name and/or address. The message portion 112 contains the actual text of the message being sent from the sender to the recipient. The attachment portion 114 can include a number of files and different formats. For example, according to at least one embodiment of the present invention, the attachment portion 114 can include an encrypted container file 116. The encrypted container file 116 will typically include one or more compressed executable program files. However, the encrypted container file 116 cannot be accessed or reviewed without using an appropriate password. Various types of container files 116 can be accessed by users depending, at least in part, on the computer operating system. Container files 116 can have various extension types including, but not limited to, ZIP, TAR, .CAB, etc.

A decryptor 118, or a similar program capable of decompressing/decrypting container files, can be used to access the encrypted container file 116. In order to do this, a password such as, for example, "HHH" is supplied when decrypting the encrypted container file 116. It should be noted that the password can be in the form of a single character, multiple characters, single word, multiple words, etc. Additionally, various combinations of characters and words can also be used.

The decryptor 118 subsequently produces a decompressed, or expanded, executable file 120. Once the executable file 120 has been expanded, a textual representation of the binary data can be examined in order to detect the presence of a computer virus. As shown in FIG. 1, the expanded file 120 contains a sequence of letters that matches a predetermined virus signature 122. At this point, an appropriate virus scanning software would label, or flag, the expanded file 120 as potentially containing a computer virus. Thus, the user can avoid opening the file and prevent damage to his or her machine. Additionally, the virus scanning program can delete and/or quarantine the expanded file 120 as necessary to prevent infection of additional files.

As shown in FIG. 1, the electronic mail message 110 also includes a message portion 112 that advises a recipient of the appropriate password for unlocking the encrypted container file 116. Without this password, conventional virus scanning programs would not be able to examine the encrypted container file 116 to detect the presence of a computer virus.

According to one or more embodiments of the present invention, if an electronic mail message 100 contains one or more encrypted container files 116, various attempts are made to identify the password used to encrypt the container file 116. For example, at least one embodiment of the present invention reviews the message portion 112 of the electronic mail message 100 in order to identify different words or groups of letters that can be used as a password. Thus, each word, or group of letters, in the message portion 112 would be provided to the descriptor 118 while attempting to decrypt the encrypted container file 116. For example, the words "hi", "how", "are", "you", "the", "key", "is", and "HHH" would be successively provided to the decryptor 118 while attempting to access the encrypted container file 116. During this process, the initial attempts at unlocking the encrypted container file 116 would fail. Eventually, however, the appropriate password would be used by the decryptor 118 to unlock the encrypted container file 116. This process would allow the encrypted container file 116 to be examined transparently before the user has a chance to release the computer virus into their system.

Figure 2:
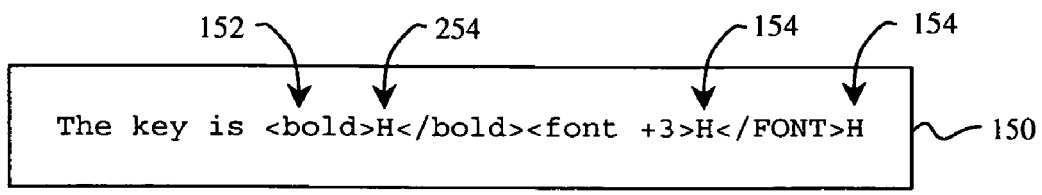
FIG. 2 is a block diagram illustrating the message portion of an electronic mail message.

Turning now to FIG. 2, a variation of the message portion of an electronic mail message 100 is illustrated. The message portion 150 shown in FIG. 2 contains a variety of formatting commands 152 that are used to format at least part of the message portion 150 contained therein. For example, the formatting commands 152 shown in FIG. 2 are used to format the letters "HHH" with bold fonts. The message portion 150 shown in FIG. 2 can sometimes avoid detection because it is not possible to electronically scan the message portion 150 and immediately identify the password. However, once the user receives the electronic mail message 100 and the message portion 150 is displayed on the screen, the user's computer will apply the appropriate formatting command and display the password "HHH".

According to one or more embodiments of the present invention, the text contained in the message portion 150 is normalized prior to examination in order to identify potential passwords. At least one way of normalizing the text involves removal of the formatting commands. For example, the commands used to format the passwords would be stripped such that only the remaining text "HHH" is left behind. Once the message portion 150 has been normalized, the different words contained therein can be examined and used as potential passwords to unlock the encrypted container file 116. The specific type of normalizing done can be varied depending on the type of formatting commands being used. For example, if HTML formatting commands are being used than a database can be provided with such commands in order to quickly identify them and remove them from the message body. Likewise, if XML: commands are being used a database can be provided to quickly identify the relevant commands. It should be noted that various types of commands and/or formatting languages exist for formatting text. All such commands and/or formatting languages should be encompassed by the present invention.

Figure 3:
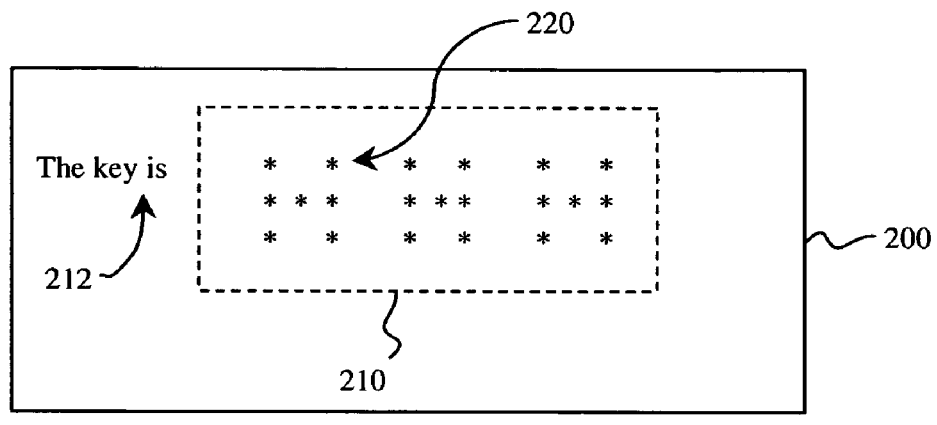
FIG. 3 is a block diagram illustrating the message portion of a second electronic mail message.
Figure 3:
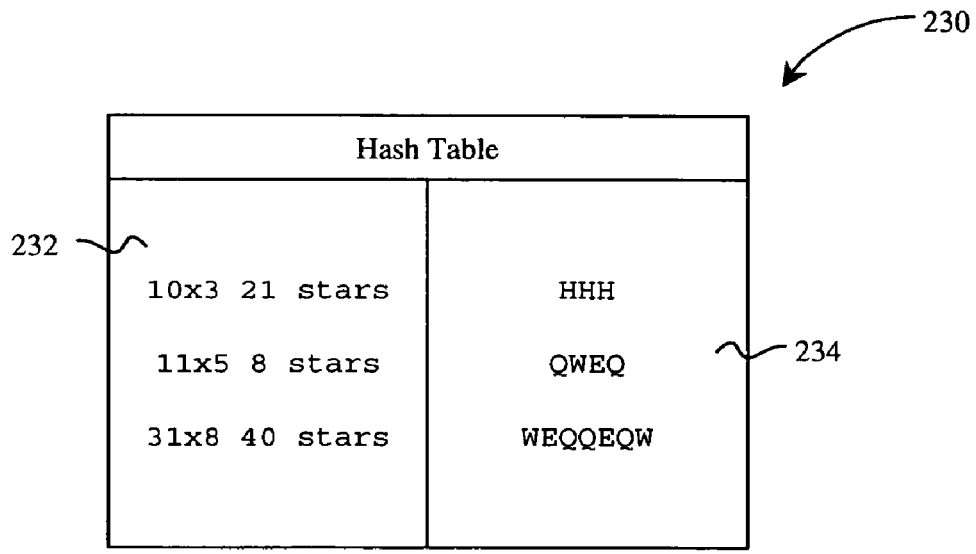

Turning now to FIG. 3, an alternative message portion 200 is illustrated. The message portion 200 in FIG. 3 differs from the previously discussed message portions in that it contains an image file 210 as well as text 212. The image file 210 is strategically positioned such that it appears as normal text when displayed on the user screen. Accordingly, when the message portion 200 shown in FIG. 3 is received at the user's computer, the sentence "the key is HHH" is displayed on the user's screen. The image file 210 will contain data in the form of pixels that replicate the shape of the letter "H". Thus, an unsuspecting user would identify the password included in the message portion 200 and supply it to the decryptor 118 to unlock the encrypted container file 116.

At least one embodiment of the present invention examines the message portion 200 of the electronic mail message 100 to determine if it contains any image files 210. If any image files 210 are detected, various optical recognition (OCR) techniques can be applied in order to identify the characters that correspond with the image. For example, by applying OCR techniques, the image file 210 would be examined to produce the letters "HHH". Once the letters have been produced, the words, or groups of letters, contained in the message portion 200 are supplied to the decryptor 118 to open the encrypted container file 116.

As various electronic mail messages 100 are processed and different image files 210 are analyzed, a hash table 230 can be constructed to store data necessary to quickly identify the corresponding text contained in an image 210. A hash is a short, approximated representation of an original, and can be achieved using various specific methods. A simple hash methodology is applied in FIG. 3 for clarity. According to at least one embodiment of the invention, the image file 210 could be given a hash value of 10×3 21 stars. The corresponding text to try and unlock an encrypted container file 116 would be "HHH". It should be noted, that one or more embodiments of the present invention allow application of various hash algorithms (e.g., MD5, SHA-512, RIPEMD-320, PANAMA, TIGER, HAVAL, etc.) to generate the hash table 230. As various image files 210 are processed, the hash values 232 and corresponding word representations 234 are saved in the hash table 230. According to such an embodiment, prior to applying an OCR technique to the image file 210, the data in the image file 210 would be examined and searched in the hash table 230. If a match is found, then the resulting word representation would be supplied to the decryptor. If the resulting word representation does not unlock the encrypted container file 116, then the OCR technique can optionally be applied to the image file 210 in order to determine if a new word representation and corresponding hash value should be entered into the hash table 210.

Figure 4:
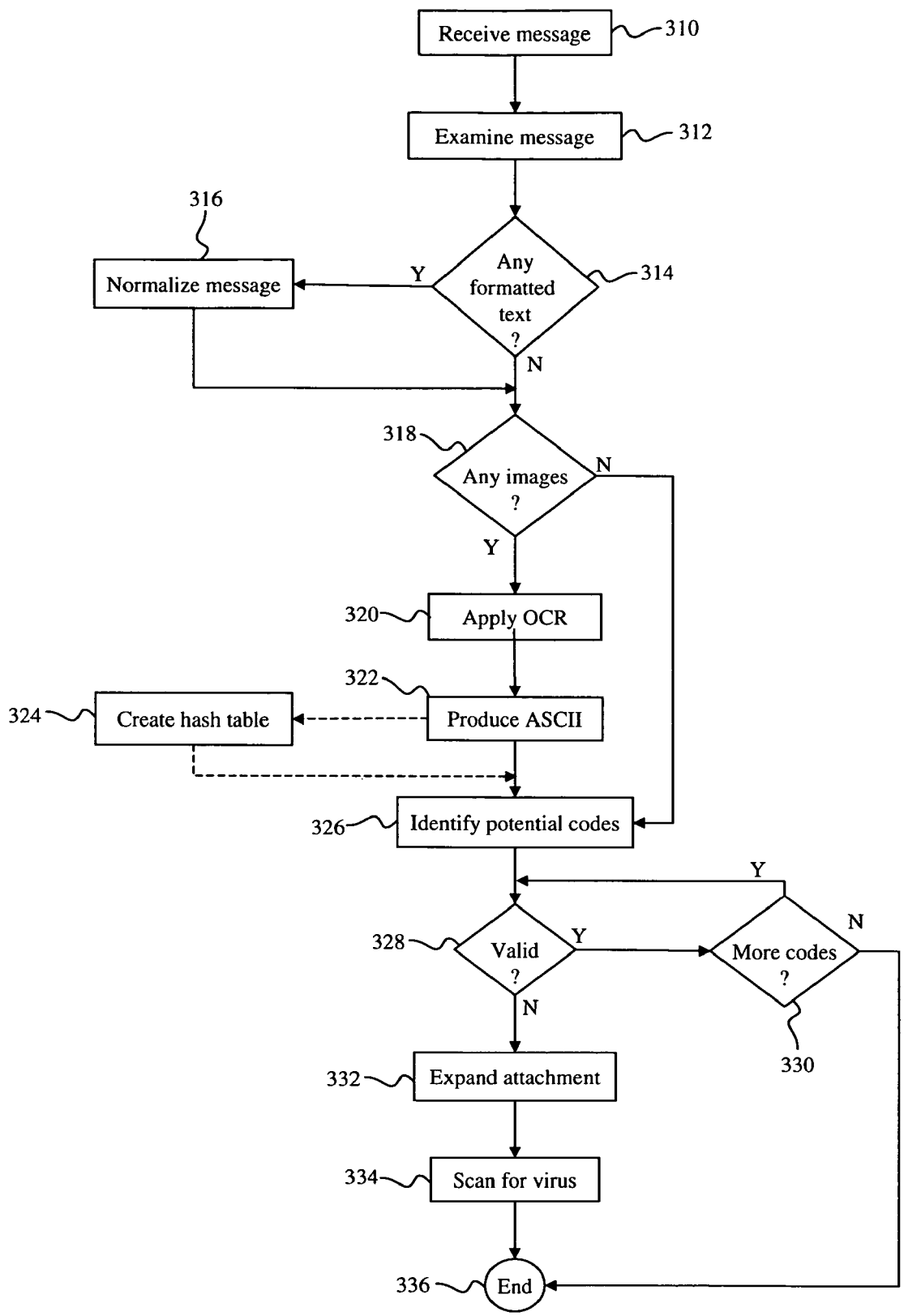
FIG. 4 is a flowchart illustrating steps performed to detect computer viruses in accordance with at least one embodiment of the present invention.

Turning now to FIG. 4, a flowchart is shown to illustrate the steps performed in detecting computer viruses according to at least one embodiment of the present invention. At step 310, the electronic mail message is received. At step 312, the electronic mail message is examined in order to determine specific information such as, for example, the type of message portion contained therein. As previously discussed, the message portion can contain plain text, text mixed with formatting commands, text mixed with images, and/or various combinations thereof. Additionally, various other types of data can be provided in the message portion of the electronic mail message. Potentially, the electronic mail message contains an attachment in the form of a container file. The container file could potentially include a virus capable of damaging the user's computer.

At step 314, it is determined if the message portion contains any formatting commands. If there are any formatting commands, then control passes to step 316 where the message portion is normalized. As previously discussed, this could involve removing formatting commands such that the text that would typically appear on the screen of the user is accessible for further processing. Control then passes to step 318. Likewise, if there are no formatting commands contained in the message portion, then control would also pass to step 318. At step 318, it is determined if the electronic mail message contains any image files. If there are any image files contained in the electronic mail message, then appropriate OCR techniques are applied at step 320. The OCR techniques would produce ASCII, or text, representations of the image files, as shown at step 322. Optionally, a hash table can be created so that the entry corresponding to the current image can be stored therein. This is done at step 324. If the electronic mail message does not contain any images, control passes to step 326 where the text in the message portion is examined in order to identify potential codes, or passwords.

At step 328, it is determined if the first code identified is valid to open the encrypted container file. If the first code does not open the encrypted container file, then control passes to step to 330. It is then determined whether or not additional codes exist. If additional codes exist, then control returns to step 328. A test is again performed to see if the current code is capable of opening the encrypted container file. Alternatively, if there are no additional codes available, then the process would end. If the code is valid, however, control passes to step 332 where the encrypted container file, or attachment, is expanded. At step 334, the expanded attachment file is examined, or is scanned, in order to identify any potential computer viruses. If a computer virus is identified, the user can be notified and/or appropriate action can be taken automatically by the virus scanning program to remove the computer virus and/or quarantine the infected file thereby preventing the virus from spreading into other files on the computer. The process would then end at step 336.

Figure 5:
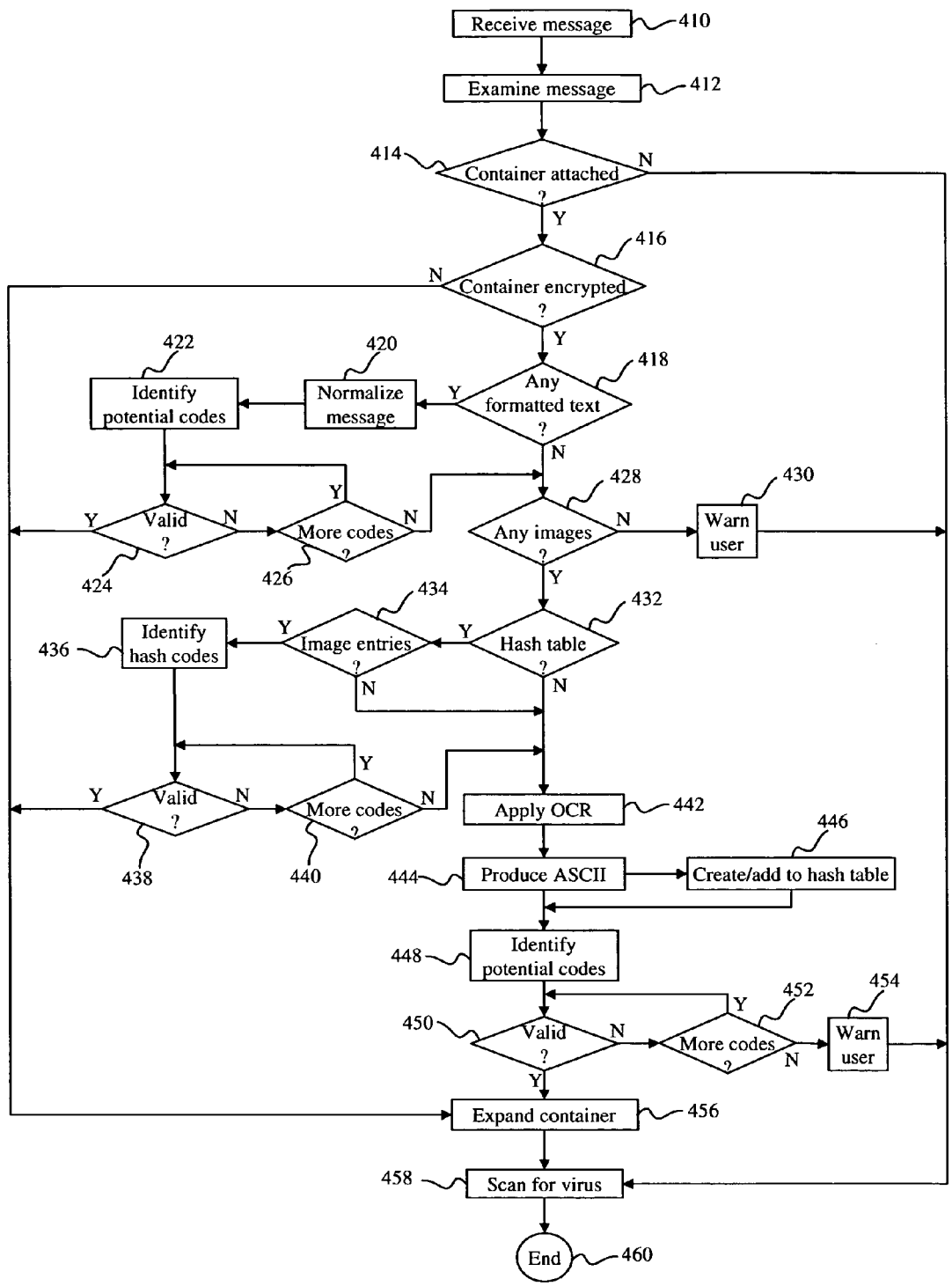
FIG. 5 is a flowchart illustrating steps performed to detect computer viruses in accordance with at least one other embodiment of the present invention.
Figure 6A:
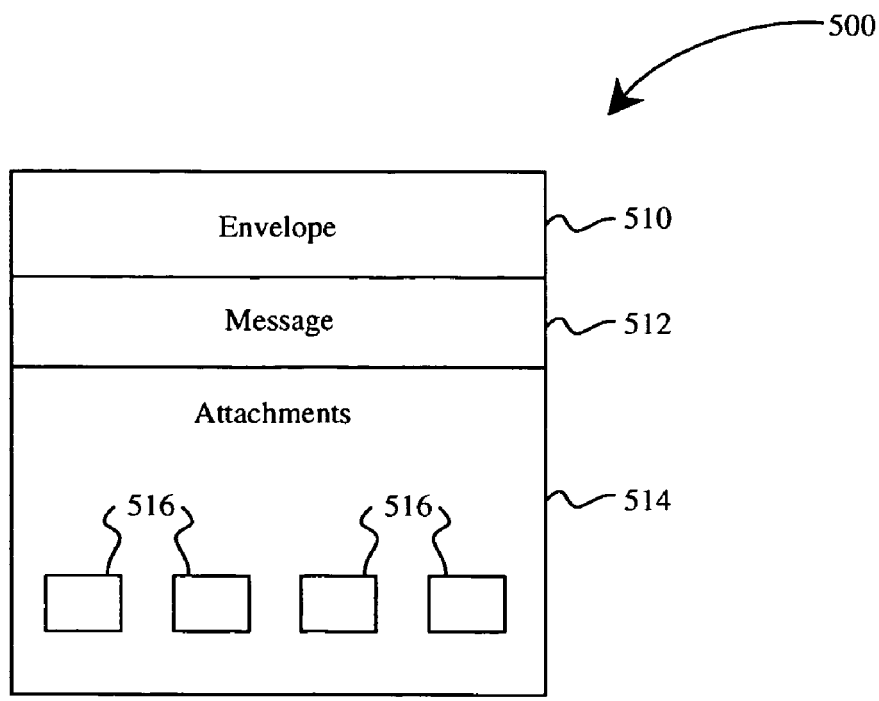
FIG. 6A is a block diagram illustrating the components of a conventional electronic mail message.
Figure 6B:
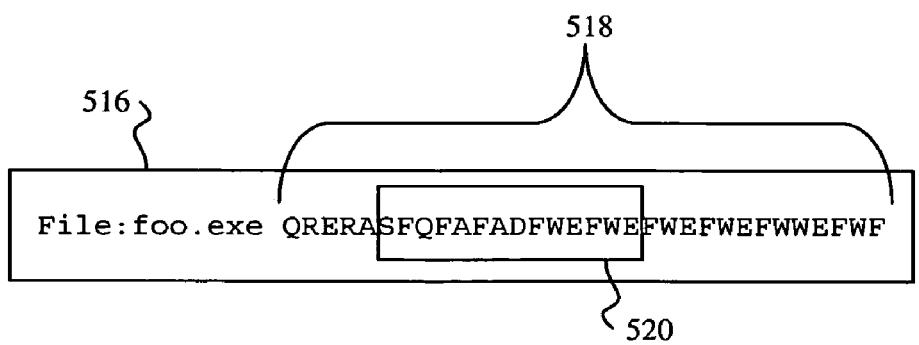
FIG. 6B is a block diagram illustrating a portion of an attachment file that has been infected with a computer virus.

FIG. 5 illustrates the steps performed in detecting computer viruses according to one or more embodiments of the present invention. At step 410, the electronic mail message is received. The electronic mail message is examined at step 412 in order to determine the information contained therein. At step 414, it is determined whether the electronic message includes a container attached thereto. If no container is attached, then control passes to step 458, where the electronic mail message is scanned for viruses. Control passes to step 416 if the electronic mail message includes a container file. At step 416, it is determined if the container file is encrypted. If there is no encryption, then control passes to step 456, where the container file is expanded into one or more files. The resulting files would be subsequently scanned for viruses at step 458.

If the container file is encrypted, then control passes to step 418 where it is determined if the electronic mail message contains any formatted text, i.e., text that includes embedded formatting commands. If there are any formatting commands, then control passes to step 420 where the message portion is normalized to remove formatting commands. This allows the actual text that appears on the screen to be processed. At step 422, the normalized message portion is examined in order to identify potential codes. As previously discussed, the potential codes correspond to passwords or similar information that is necessary to unlock the container prior to expansion. At step 424, it is determined if the first code identified is valid to open the encrypted container file. If the first code does not open the encrypted container file, then control passes to step to 426. It is then determined whether or not additional codes exist. If additional codes exist, then control returns to step 424. A test is again performed to see if the current code (e.g., the next code which has not been tried) is capable of unlocking the encrypted container file. Alternatively, if there are no additional codes available, then control passes to step 428. If the code being tested is valid, however, control passes to step 456 where the encrypted container file is expanded.

At step 428, it is determined if the electronic mail message contains any image files. If there are no image files, then a warning message can be provided to the user. The warning message could, for example, advise the user that the electronic mail message includes an encrypted container that could possibly be carrying a virus. Additional information and/or suggestions can be provided to the user to help prevent damage in the event a virus is actually present. In any case, one or more embodiments of the present invention could also make various attempts, at step 458, to scan the container file for viruses.

If the electronic mail message contains any images, then control passes to step 432, where it is determined if a hash table exists. If there is a hash table, then it is determined if the hash table contains entries for the images present at step 434. If there is no hash table, or entries do not exist for the images in the hash table, then control passes to step 442. If there are entries present in the hash table for the images, then the corresponding hash codes are identified at step 436. The hash codes are also passwords that can be used to unlock encrypted container files. At step 438, it is determined if the first code identified is capable of opening the encrypted container file. If the first code does not open the encrypted container file, then control passes to step to 440. It is then determined whether or not additional hash codes exist. If additional codes exist, then control returns to step 438. A test is again performed to see if the next code is capable of unlocking the encrypted container file. Alternatively, if there are no additional hash codes available, then control passes to step 442. If the code is valid, however, control passes to step 456, where the encrypted container file is expanded.

At step 442, appropriate OCR techniques are applied to the image files. The OCR techniques can produce, according to at least one embodiment of the present invention, ASCII (or text) representations of the image files, as shown at step 444. A hash table can be created at step 446, if none currently exists. Furthermore, the ASCII representations produced at step 444 can be used to produce and store entries, within the hash table, that correspond to the current images. According to one or more embodiments of the present invention, the hash table alone can be used because it is computationally less expensive than OCR. Other embodiments of the invention, however, can utilize OCR exclusively and/or in conjunction with a hash table.

At step 448, the ASCII (or text) representations produced are used to identify potential codes capable of unlocking the container file. At step 450, it is determined if the first code identified is capable of opening the encrypted container file. If the first code does not open the encrypted container file, then control passes to step to 452. It is then determined whether or not additional codes exist. If additional codes exist, then control returns to step 450. A test is again performed to see if the next code is capable of unlocking the encrypted container file. Alternatively, if there are no additional codes available, then control passes to step 454 where a warning can be provided to the user. The electronic mail message and/or container file would be scanned for viruses at step 458. If the code is valid, then control would pass to step 456 where the encrypted container file is expanded. A virus scan is performed at step 458 to identify potential threats to the user's computer. As previously discussed, if a computer virus is identified, the user can be notified and/or appropriate action can be taken automatically by the virus scanning program to remove the computer virus and/or quarantine infected files. This could prevent the virus from spreading into other files on the computer and possibly causing damage that cannot be repaired. The process would then end at step 460.

The many features and advantages of the invention are apparent from the detailed specification, and thus, the appended claims are intended to cover all such features and advantages which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A method of detecting computer viruses comprising the steps:

receiving an electronic mail message at an intended recipient's computer, including a message portion and at least one encrypted attachment, wherein the encrypted attachment is at least encrypted separately from the message portion, the encrypted attachment is of a type for which a corresponding encryption code can be included in the message portion, and the electronic mail message and the encrypted attachment are received together as a combined entity;

examining the message portion of the electronic mail message to identify one or more potential encryption codes, the exact location of the corresponding encryption code within the message portion of the electronic mail message being unknown;

using the potential encryption codes to attempt to decrypt one or more of the encrypted attachments; and if an encrypted attachment is decrypted, scanning the decrypted attachment for computer viruses.

2. The method of claim 1, wherein the step of using the potential encryption codes includes expanding one or more of the encrypted attachments into one or more files.

3. The method of claim 1, further comprising a step of normalizing the electronic mail message prior to performing the step of examining.

4. The method of claim 3, wherein the step of normalizing comprises a step of removing formatting commands from the electronic mail message.

5. The method of claim 4, wherein the formatting commands include HTML commands.

6. The method of claim 4, wherein the formatting commands include XML commands.

7. The method of claim 1, wherein the step of examining further comprises the steps:
 identifying an image contained in the electronic mail message;
 applying one or more OCR techniques to convert the image to one or more symbols; and
 examining the symbols to identify potential encryption codes.

8. The method of claim 7, wherein the one or more symbols are ASCII symbols.

9. The method of claim 7, further comprising a step of creating a database for storing data regarding potential encryption codes identified from the symbols.

10. The method of claim 9, wherein the database includes a table containing a hash representation of images and a potential encryption code corresponding to each hash representation.

11. The method of claim 1, further comprising a step of scanning the remainder of the electronic mail message for computer viruses.

12. A computer program product for detecting computer viruses, the computer program product comprising a computer usable medium having computer readable instructions therein for causing a processor to perform steps when executed on a computer of an intended recipient of an electronic mail message which:
 examine a message portion of an electronic mail message including the message portion and one or more encrypted attachments, wherein the encrypted attachment is at least encrypted separately from the message portion, the encrypted attachment is of a type for which a corresponding encryption code can be included in the message portion, and the electronic mail message and the encrypted attachment are received together as a combined entity, and the exact location of the corresponding encryption code within the message portion of the electronic mail message is unknown, to identify potential encryption codes;
 use the potential encryption codes to attempt to decrypt one or more of the encrypted attachments; and
 if an encrypted attachment is decrypted, scan the decrypted attachment for computer viruses.

13. The computer program product of claim 12, wherein the instructions further cause the processor to normalize the electronic mail message prior to examination.

14. The computer program product claim 12, wherein, during examination of the electronic mail message, the instructions further cause the processor to:
 identify an image contained in the electronic mail message;
 apply one or more OCR techniques to convert the image to one or more symbols; and
 examine the symbols to identify potential encryption codes.

15. The computer program product of claim 14, wherein the instructions further cause the processor to create a database for storing data regarding potential encryption codes identified from the symbols.

16. A system for detecting computer viruses, said system comprising a computer of an intended recipient of an electronic mail message configured to:
 examine an electronic mail message including a message portion and one or more encrypted attachments, wherein the encrypted attachment is at least encrypted separately from the message portion, the encrypted attachment is of a type for which a corresponding encryption code can be included in the message portion, and the electronic mail message and the encrypted attachment are received together as a combined entity, and the exact location of the corresponding encryption code within the message portion of the electronic mail message is unknown, to identify potential encryption codes;
 use the potential encryption codes to attempt to decrypt one or more of the encrypted attachments; and
 if an encrypted attachment is decrypted, scan the decrypted attachment for computer viruses.

17. The system of claim 16, wherein said computer is further configured to normalize said electronic mail message prior to examination.

18. The system of claim 16, wherein, during examination of the electronic mail message, said computer is further configured to:
 identify an image contained in said electronic mail message;
 apply one or more OCR techniques to convert said image to one or more symbols; and
 examine said symbols to identify potential encryption codes.

19. The system of claim 18, wherein said computer is further configured to create a database for storing data regarding potential encryption codes identified from said symbols.

20. A system for detecting computer viruses in an electronic mail message at an intended recipient's computer comprising:
 means for examining a message portion of an electronic mail message including the message portion and one or more encrypted attachments, wherein the encrypted attachment is at least encrypted separately from the message portion, the encrypted attachment is of a type for which a corresponding encryption code can be included in the message portion, and the electronic mail message and the encrypted attachment are received together as a combined entity, and the exact location of the corresponding encryption code within the message portion of the electronic mail message is unknown, to identify potential encryption codes;
 use the potential encryption codes to attempt to decrypt one or more of the encrypted attachments; and
 means for scanning a decrypted attachment for computer viruses.

21. The system of claim 20, further comprising means for normalizing said electronic mail message.

22. The system of claim 20, wherein said means for examining further comprises:
 means for identifying an image contained in said electronic mail message;
 means for applying one or more OCR techniques to convert said image to one or more symbols; and
 means for examining said symbols to identify potential encryption codes.

23. The system of claim 22, further comprising means for creating a database for storing data regarding potential encryption codes identified from said symbols.

* * * * *